(12) United States Patent
Di Censo et al.

(10) Patent No.: US 11,267,383 B2
(45) Date of Patent: Mar. 8, 2022

(54) LEG SUPPORT FOR A VEHICLE SEAT

(71) Applicant: Faurecia Automotive Seating, LLC, Auburn Hills, MI (US)

(72) Inventors: Davide Di Censo, Sunnyvale, CA (US); Cedric Ketels, Auburn Hills, MI (US); Thomas Dessapt, Auburn Hills, MI (US); Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/910,312

(22) Filed: Jun. 24, 2020

(65) Prior Publication Data
US 2021/0402903 A1     Dec. 30, 2021

(51) Int. Cl.
| | |
|---|---|
| *B60N 2/90* | (2018.01) |
| *B60N 2/66* | (2006.01) |
| *B60N 3/06* | (2006.01) |
| *B60R 7/04* | (2006.01) |
| *B60N 3/00* | (2006.01) |

(52) U.S. Cl.
CPC ............ *B60N 2/995* (2018.02); *B60N 2/663* (2015.04); *B60N 3/063* (2013.01); *B60R 7/043* (2013.01); *B60N 3/001* (2013.01)

(58) Field of Classification Search
CPC ........ B60N 2/995; B60N 2/663; B60N 3/063; B60N 3/001; B60R 7/043
USPC ..................................................... 297/423.36
See application file for complete search history.

(56) References Cited

U.S. PATENT DOCUMENTS

| | | | |
|---|---|---|---|
| 6,352,309 B1 | 3/2002 | Beroth | |
| 8,888,189 B2 * | 11/2014 | Tamura | ................. B60N 2/067 297/423.19 |
| 9,855,860 B2 * | 1/2018 | Ahn | ......................... B60N 2/91 |
| 2014/0225400 A1 | 8/2014 | Nagayasu | |
| 2014/0300145 A1 | 10/2014 | Beroth | |
| 2014/0375087 A1 | 12/2014 | Kuno | |
| 2017/0361747 A1 * | 12/2017 | Heffran | ................. B60N 2/663 |
| 2019/0351800 A1 * | 11/2019 | Seibold | ............... B60N 2/0224 |

FOREIGN PATENT DOCUMENTS

| | | |
|---|---|---|
| DE | 10047740 A1 | 6/2002 |
| FR | 2880597 B1 | 7/2006 |
| WO | 2001025053 A1 | 4/2001 |
| WO | 2014139179 | 9/2014 |

\* cited by examiner

*Primary Examiner* — Mark R Wendell
(74) *Attorney, Agent, or Firm* — Barnes & Thornburg LLP

(57) ABSTRACT

An occupant support may include a seat bottom and a seat back coupled to the seat bottom. In some embodiments, a leg support system is coupled to the seat bottom and configured to support an occupant's leg when in an extended position.

20 Claims, 6 Drawing Sheets

LEG SUPPORT FOR A VEHICLE SEAT

BACKGROUND

The present disclosure relates to occupant supports, and particularly to movable occupant supports. More particularly, the present disclosure relates to occupant supports with leg supports for use in vehicles.

SUMMARY

According to the present disclosure, a vehicle includes a vehicle body defining a cabin and a plurality of occupant supports arranged in the cabin. The cabin is separated into a front section and one or more rear sections. The rear section includes at least one rear occupant support.

In illustrative embodiments, the rear occupant support is arranged to lie within a passenger compartment. The passenger compartment extends from the rear section of the cabin to the front section of the cabin. The passenger compartment is configured to provide more space for a passenger seated on the rear occupant support so that the passenger can fully extend his or her legs and has accessible storage space for personal belongings to provide a more comfortable experience for the passenger.

In illustrative embodiments, a passenger-comfort module is provided in the passenger compartment to increase comfort for the occupant on the rear occupant support. The passenger-comfort module includes a removable lumbar support and a leg support system that cooperate to provide a reclining effect for the occupant. The leg support system includes a first leg support coupled to the rear occupant support and a second leg support mounted on tracks in front of the rear occupant support. The tracks may have previously been used to mount a front occupant support to the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 shows a perspective and diagrammatic view of a portion of a vehicle including a front-row region and a rear-row region and showing a passenger compartment that extends from the rear-row region to the front row region without a front-row occupant support to fit an occupant-comfort module including a leg support system having a first leg support coupled to a rear-row occupant support in the rear-row region and a second leg support mounted to the vehicle in the front-row region to provide a passenger seated on the rear-row occupant support with more leg room and accessible storage space in the passage compartment for increased comfort;

Figure 8:
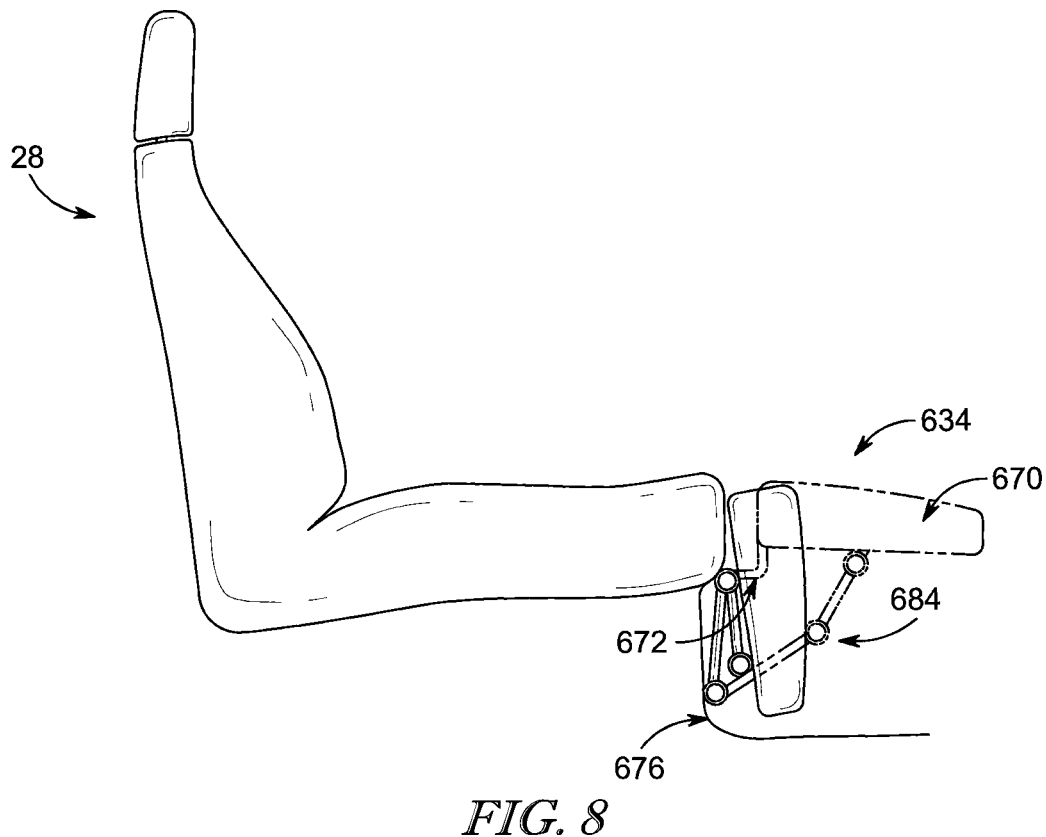
Figure 9:
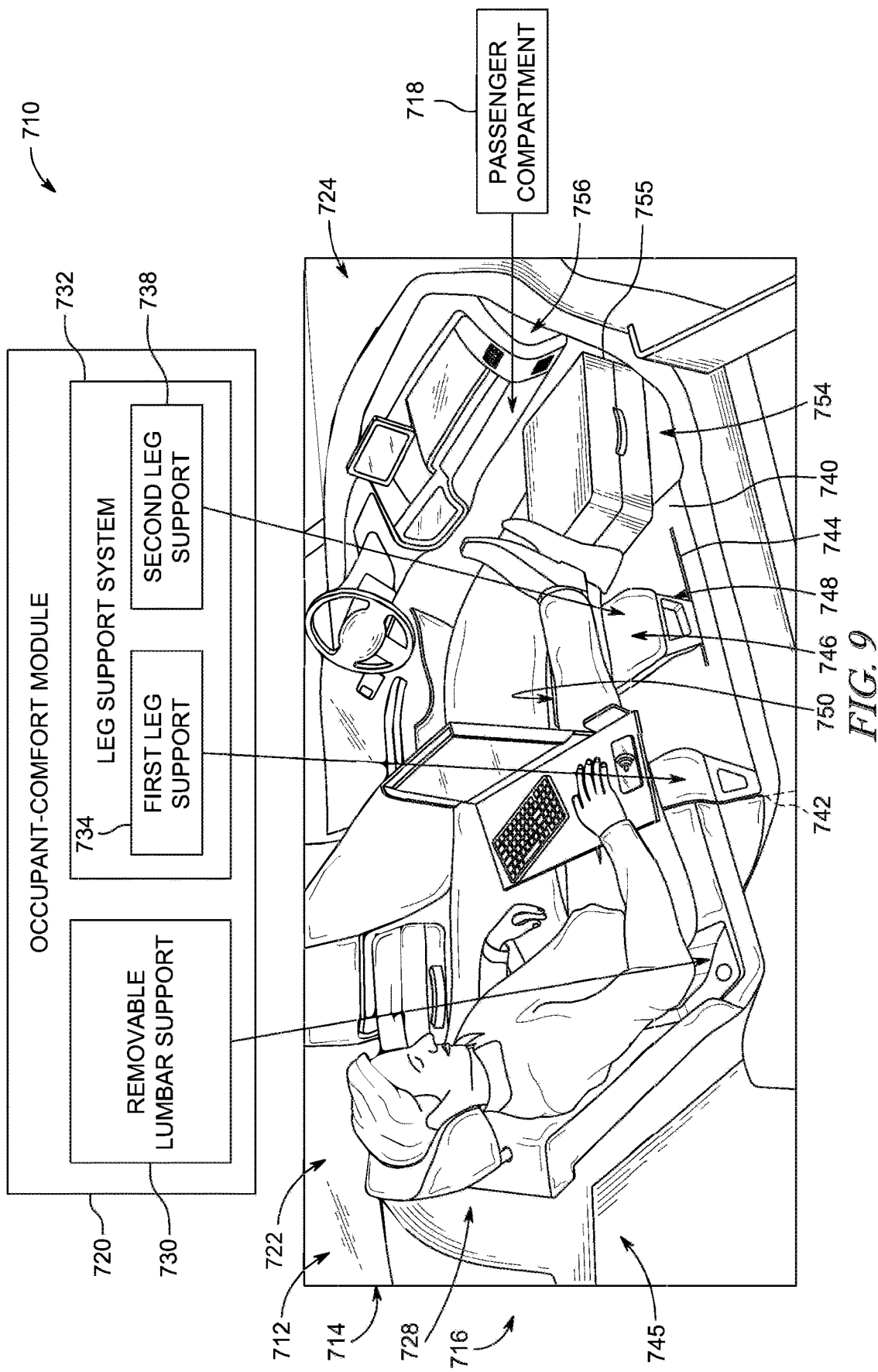

FIG. 8 is a side elevation view of a sixth embodiment of a first leg support included in the occupant-support module and including a cushion, a fixed mount, and an over-center linkage system configured to support the cushion in an extended position; and FIG. 9 is a perspective view of portions of a vehicle having another occupant-support module arranged to lie in a passenger compartment without a front-row occupant support to provide a passenger seated on the rear-row occupant support with more leg room and accessible storage space in the passage compartment for increased comfort.

DETAILED DESCRIPTION

Figure 1:
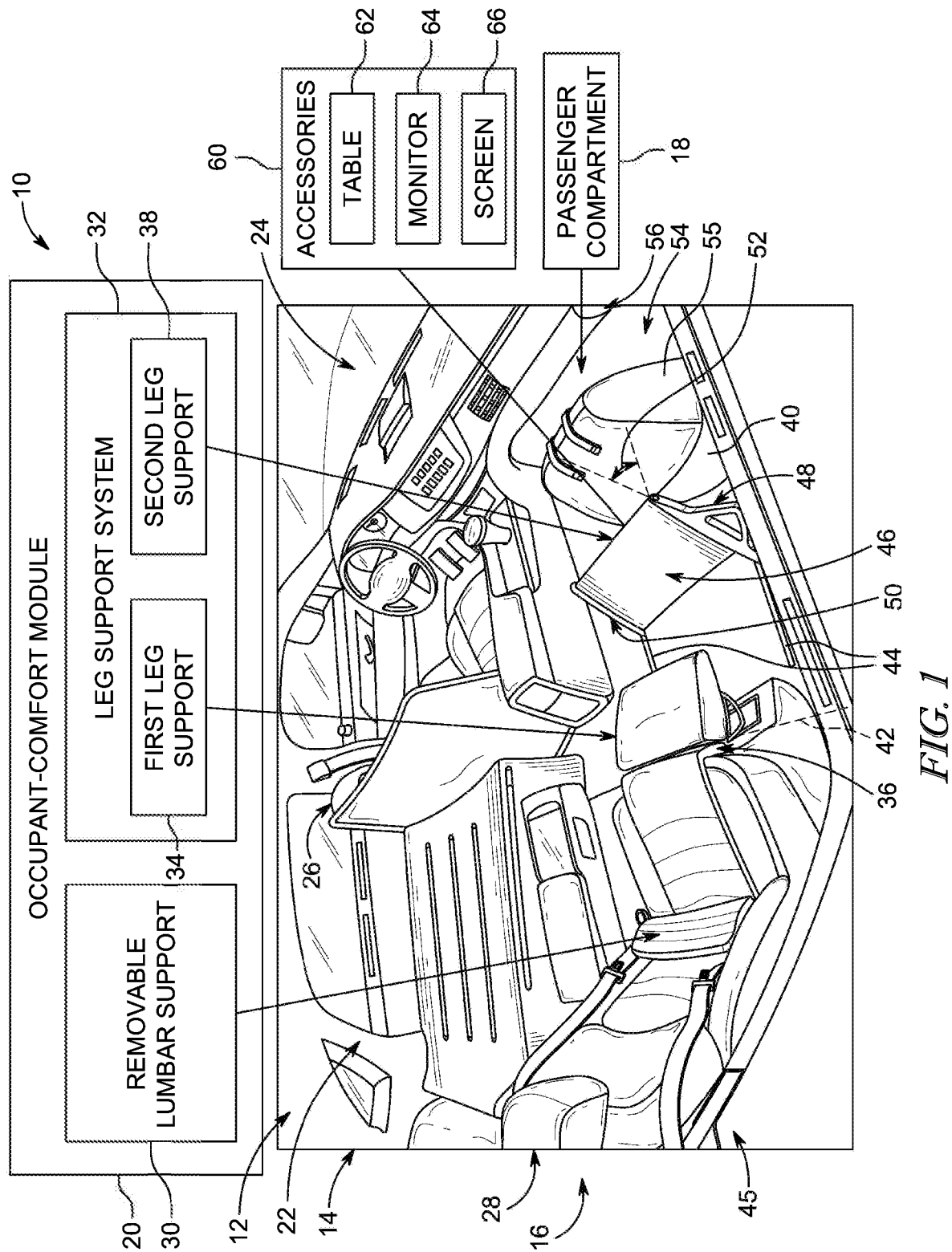

An over-the-road vehicle 10, in accordance with the present disclosure, is shown in FIG. 1. The vehicle 10 includes a vehicle body 12 that defines a cabin 14 of the vehicle 10 and a plurality of occupant supports 16 arranged to lie within the cabin 14. A portion of the cabin 14 provides a passenger compartment 18 which is sized to increase comfort for a passenger being transported in the vehicle 10. Situated within the passenger compartment 18 is an occupant-comfort module 20 that is configured to support portions of the occupant to improve comfort and an overall experience while traveling within the vehicle 10. A second embodiment of an occupant-comfort module 720 is shown in FIG. 9.

The cabin 14 of the vehicle 10 is divided into one or more rear sections 22 and a forward section 24. The passenger compartment 18 may be greater than or equal to about half of a total cumulative volume of the cabin 14. The rear section 22 contains at least one rear occupant support 28 to support a passenger for transportation in the vehicle 10. The forward section 24 contains only one front occupant support 26. The front occupant support 26 is arranged forward of the rear occupant support 28 and is laterally offset from the rear occupant support so that the passenger compartment 18 extends from the rear section 22 to the forward section unobstructed by any front occupant support 26. The only occupant support 16 within the passenger compartment 18 is a rear occupant support 28 so that the occupant can fully extend his or her legs and is provided with increased storage space in the passenger compartment 18 so that personal items are accessible by the passenger during transportation.

The forward section 24 may be a front row of the vehicle or a middle row of the vehicle if the vehicle has more than two rows of occupant supports.

The occupant-comfort module 20 is configured to enhance comfort for the passenger seated on the rear occupant support 28 in the passenger compartment 18 as shown in FIG. 1. The occupant-comfort module 20 includes a removable lumbar support 30 and a leg support system 32. The removable lumbar support 30 is configured to improve posture by engaging the occupant's lower back so that the occupant's spine is urged to an S-shape. The removable lumbar support 30 may cause the passenger's pelvic region and legs to be shifted forward relative to the occupant support such that the occupant's legs have less contact with the occupant support than they would absent the removable lumbar support 30. The leg support system 32 is configured to engage portions of the passenger's legs to increase overall support and comfort for the passenger.

The removable lumbar support 30 and the leg support system 32 may cooperate to provide a reclining effect on the passenger without moving any portion of the occupant support 28. Such an effect may be beneficial when used with rear-row occupant supports that have less functionality than front-row occupant supports, for example, when the rear-row occupant support is positioned against a rear panel 45 of the vehicle 10 and cannot recline due to this arrangement. Since the rear occupant support 28 is positioned behind the front-row occupant support 26, privacy is also increased for the passenger.

The leg support system 32 includes a first leg support 34 coupled to a front end 36 of the rear occupant support 28 and a second leg support 38 spaced apart from the rear occupant support 28 and the first leg support 34 as shown in FIG. 1. The first leg support 34 is mounted to the front end 36 of the rear occupant support 28 to support the passenger's thighs and/or calves. The second leg support 38 is mounted to a floor 40 of the vehicle 10 in front of the rear occupant support 28 to support the occupants feet.

The first leg support 34 may be a stationary structure or may be mounted to the front end 36 of the rear occupant support 28 for pivotable movement relative to the occupant support 28 about a pivot axis 42 to raise and lower the first leg support 34. The first leg support 34 may also be adjustable in length to accommodate passengers of different sizes. An example of a leg support suitable for use as the first leg support 34 in the illustrative embodiment is shown and described in U.S. Pat. No. 10,513,212, issued Dec. 24, 2019 to Faurecia Automotive Seating, LLC of Auburn Hills, Mich., which is expressly incorporated herein in its entirety for the purpose of describing a leg support mounted to an occupant support.

The second leg support 38 is mounted to tracks 44 located in front of the rear occupant support 28 in the forward section 24 as shown in FIG. 1. The tracks 44 may have been used to mount a front-row occupant support to the floor 40 of the vehicle 10 which the second leg support 38 has taken then place of. The second leg support 38 is slidable forward and backward along the tracks 44 and may be locked in place at any point along a length of the tracks 44 to fit passengers of different sizes. The location of the second leg support 38 relative to a front panel or dash 56 of the vehicle 10 provides a storage space 54 that can be used to store one or more of the passenger's items such as a travel bag 55. The passenger's items in the storage space 54 are accessible by the passenger when desired as opposed to being stored in an inaccessible location such as a trunk of the vehicle 10.

The second leg support 38 includes a footrest 46, a first mount 48, and a second mount 50 as shown in FIG. 1. The footrest 46 is a flat panel that is arranged at an angle 52 relative to the floor 40 of the vehicle 10. The footrest 46 is coupled at each end to the first mount 48 and the second mount 50, respectively. The first and second mounts 48, 50 are coupled to an associated track 44 that extends along the floor 40 to fix the footrest 46 in position relative to the rear occupant support 28.

The angle 52 is inclined so that the footrest 46 extends outwardly away from the rear occupant support 28 as shown in FIG. 1. The footrest 46 provides a platform for the passenger to use to counter act inertial forces experienced by the passenger during vehicle braking thereby increasing safety of the passenger in the vehicle 10. The footrest 46 and/or each mount 48, 50 may be adjustable, in some embodiments, to change the incline angle 52 of the footrest 46 relative to the floor 40 of the vehicle 10. The angle 52 may be within a range of about 90 degrees to about 0 degrees relative to the floor 40.

Figure 2:
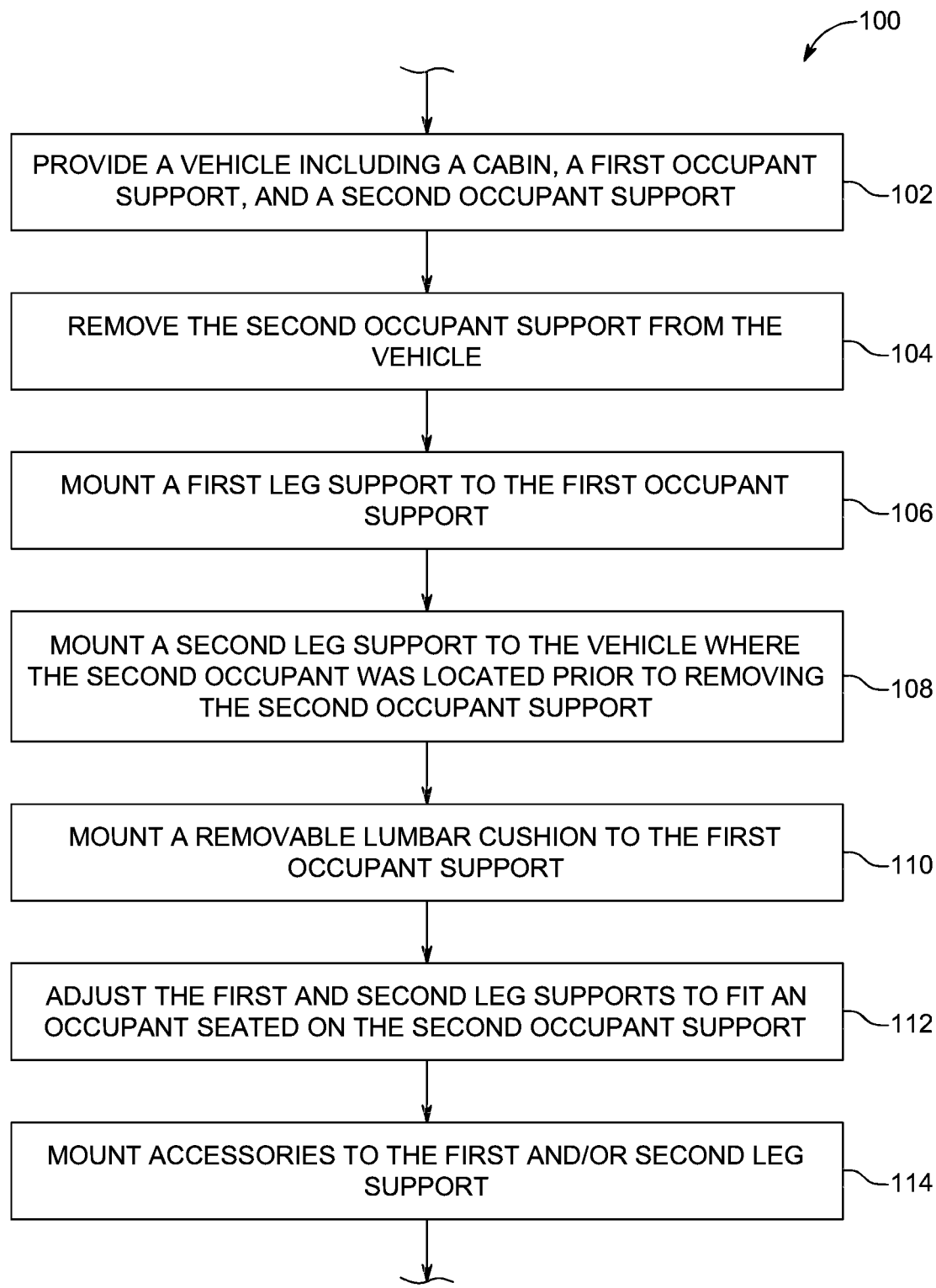
FIG. 2 is a flow chart describing a process by which a vehicle may be transformed to include the occupant-support module.

In the illustrative embodiment, the vehicle 10 is retrofitted with the occupant-comfort module 20 according to a process 100 of providing and using the occupant-comfort module 20 as shown in FIG. 2. The process 100 may include a step 102 of providing the vehicle 10 including the cabin 14. The cabin 14 may house a plurality of occupant supports 16 including a first occupant support 28 and a second occupant support (not shown) directly in front of the first occupant support 28. The second occupant support may be removed from the vehicle 10 at a step 104 thereby exposing the tracks 44 that previously secured the second occupant support to the floor 40 of the vehicle 10. With the second occupant support removed, the passenger compartment is established which allows a passenger seated in the first occupant support 28 to fully extend their legs for greater comfort. In some embodiments, steps 102 and 104 may be omitted if the vehicle 10 is specifically designed to not include a second occupant support directly in front of the first occupant support 28.

The process 100 may further include several steps of attaching the occupant-comfort module 20 to the first occupant support 28 and the vehicle 10. The process may include a step 106 of mounting the first leg support 34 to the first occupant support 28. The first leg support may be factory installed on the first occupant support 28 or installed at a later time. The process 100 may further include a step 108 of mounting the second leg support 38 to the tracks 44 where the second occupant support was located prior to being removed at step 104. The removable lumbar cushion may also be coupled to the first occupant support 28 at a step 110.

Once the occupant-comfort module 20 is attached to the first occupant support 28 and the vehicle 10, the process 100 may include steps of using the occupant-comfort module 20. The first and second leg supports 34, 38 may be adjusted to fit a particular occupant at step 112. The step 112 of adjusting the occupant-comfort module 20 may include raising or lowering the first leg support 34 and sliding the second leg support 38 forward or backward. One or more accessories 60 may be coupled to the first or second leg supports 34, 38 at step 114. The accessories 60 may include a table 62, a monitor 64, a privacy screen 66, or any other type of accessory that increases comfort for the passenger in the passenger compartment 18 as shown in FIG. 1.

Figure 3:
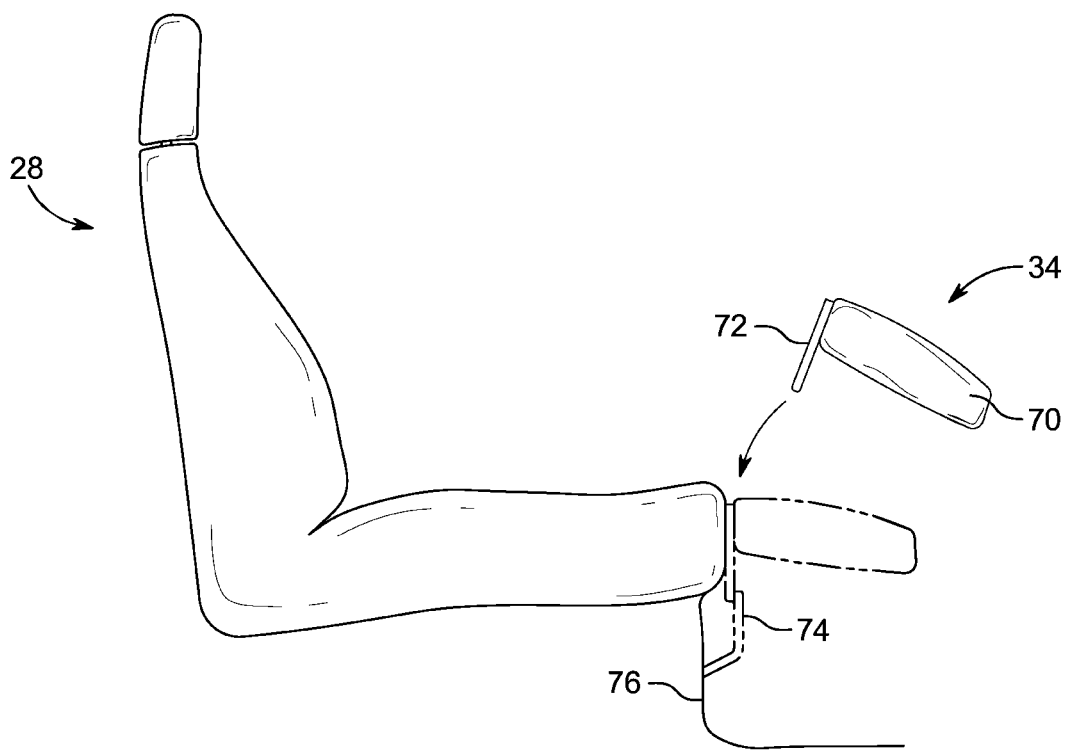
FIG. 3 is a side elevation view of a first embodiment of the first leg support included in the occupant support module having a removable cushion and a fixed bracket coupled to the rear-row occupant support to receive a mount flange of the removable cushion and retain the removable cushion to the rear-row occupant support.

The first leg support 34 in the illustrative embodiment is removable from the rear occupant support 28 as suggested in FIG. 3. The first leg support 34 includes a cushion 70, a mount flange 72, and a retainer bracket 74. The cushion 70 is configured to support the thigh and/or calf of the passenger to increase comfort for the passenger. The mount flange 72 is coupled to the cushion 70 and extends downwardly from the cushion 70. The retainer bracket 74 is configured to be coupled to a frame structure 76 of the rear occupant support 28. The mount flange 72 is sized to fit between the retainer bracket 74 and the frame structure 76 to mount the first leg support 34 to the rear occupant support 28. Once mounted to the rear occupant support 28 the first leg support 34 increases a length of the occupant support 28 and supports the passenger's legs in an extended position for greater comfort.

Figure 4:
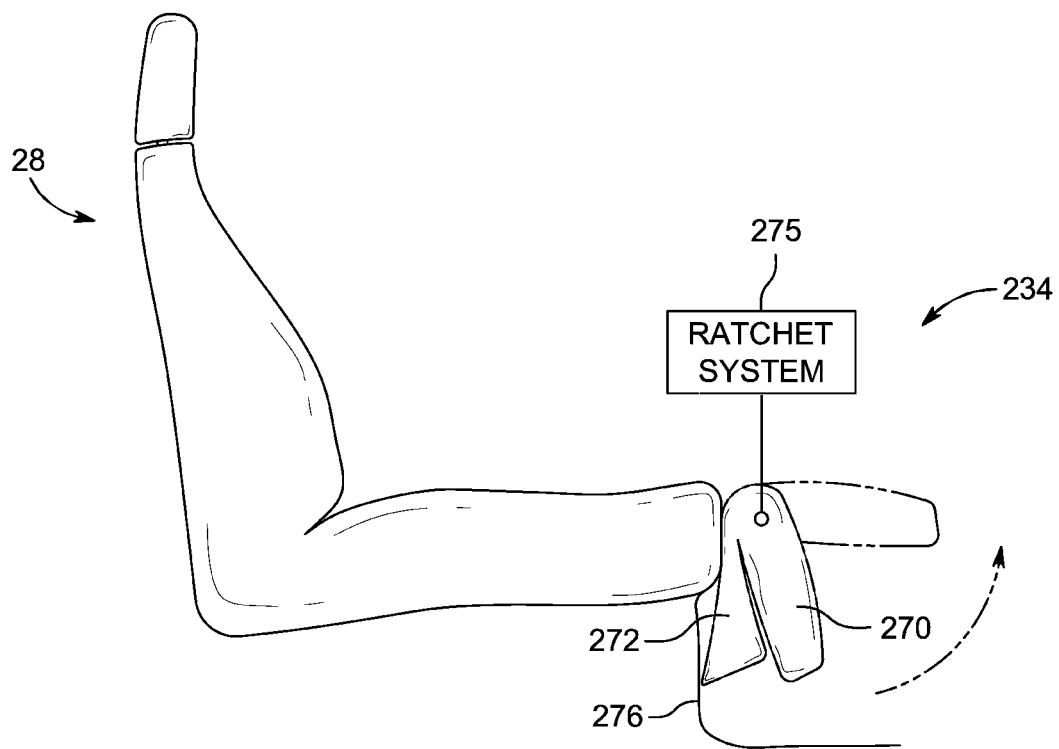
FIG. 4 is a side elevation view of a second embodiment of a first leg support included in the occupant support module and including a cushion, a fixed mount, and a ratchet system configured to control pivotable movement of the cushion relative to the fixed mount and angular orientation of the cushion relative to the fixed mount.

A second embodiment of a first leg support 234 is shown in FIG. 4. The leg support 234 is similar to the first embodiment of the leg support 34 shown in FIGS. 1 and 3 and similar reference numbers in the 200 series are used to describe common features between leg support 34 and leg support 234. Accordingly, the disclosure of leg support 34 is incorporated by reference for leg support 234 and differences between leg support 34 and leg support 234 are described below.

Leg support 234 includes a cushion 270, a fixed mount 272, and a ratchet system 275 as shown in FIG. 4. The cushion 270 is configured to pivot relative to the fixed mount 272 between a storage position and an extended position as suggested in FIG. 4. The fixed mount 272 is coupled to a frame structure 276 of the rear occupant support 28 to secure the leg support 234 to the rear occupant support 28. The ratchet system 275 controls movement of the cushion 270 relative to the fixed mount 272 by allowing upward pivoting of the cushion 270 from the storage position to the extended position. The ratchet system 275 allows the cushion 270 to be locked at any orientation between the storage position and the extended position. The ratchet system 275 blocks downward pivoting of the cushion 270 relative to the fixed mount 272 until the cushion 270 is pulled upwardly past the fully extended position, thereby releasing the ratchet system 275 so that the cushion 270 can return to the storage position.

Figure 5:
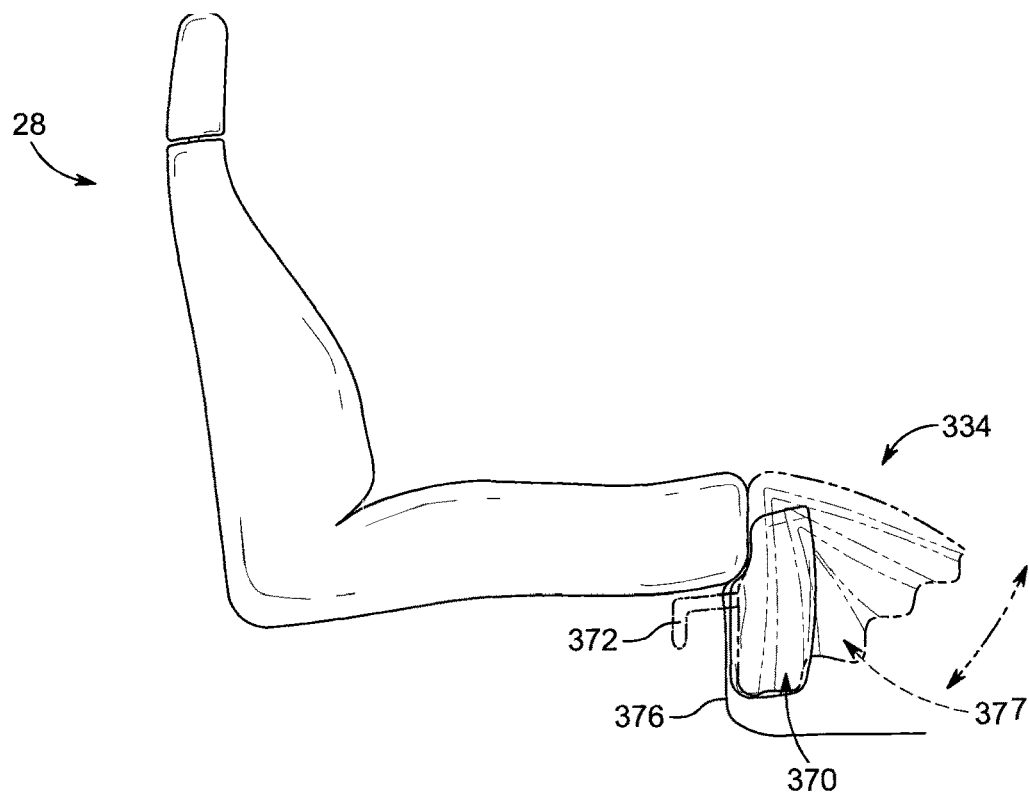
FIG. 5 is a side elevation view of a third embodiment of a first leg support included in the occupant support module and including a cushion, a fixed mount, and a plurality of inflatable bladders arranged to lie between the cushion and the fixed mount and configured to raise the cushion away from the fixed mount when inflated.

A third embodiment of a first leg support 334 is shown in FIG. 5. The leg support 334 is similar to the second embodiment of the leg support 234 shown in FIG. 4 and similar reference numbers in the 300 series are used to describe common features between leg support 234 and leg support 334. Accordingly, the disclosure of leg support 234 is incorporated by reference for leg support 334 and differences between leg support 234 and leg support 334 are described below.

Leg support 334 includes a cushion 370, a fixed mount 372, and a plurality of inflatable bladders 377 as shown in FIG. 5. The cushion 370 is configured to pivot relative to the fixed mount 372 between a storage position and an extended position as suggested in FIG. 5. The fixed mount 372 is coupled to a frame structure 376 of the rear occupant support 28 to secure the leg support 334 to the rear occupant support 28. The plurality of inflatable bladders 377 controls movement of the cushion 370 relative to the fixed mount 372 by pushing the cushion 370 to pivot upwardly from the storage position to the extended position when being inflated and allowing the cushion 370 to pivot downwardly when being deflated. Inflation of the bladders 377 may be stopped to lock the cushion 370 at any orientation between the storage position and the extended position.

Figure 6:
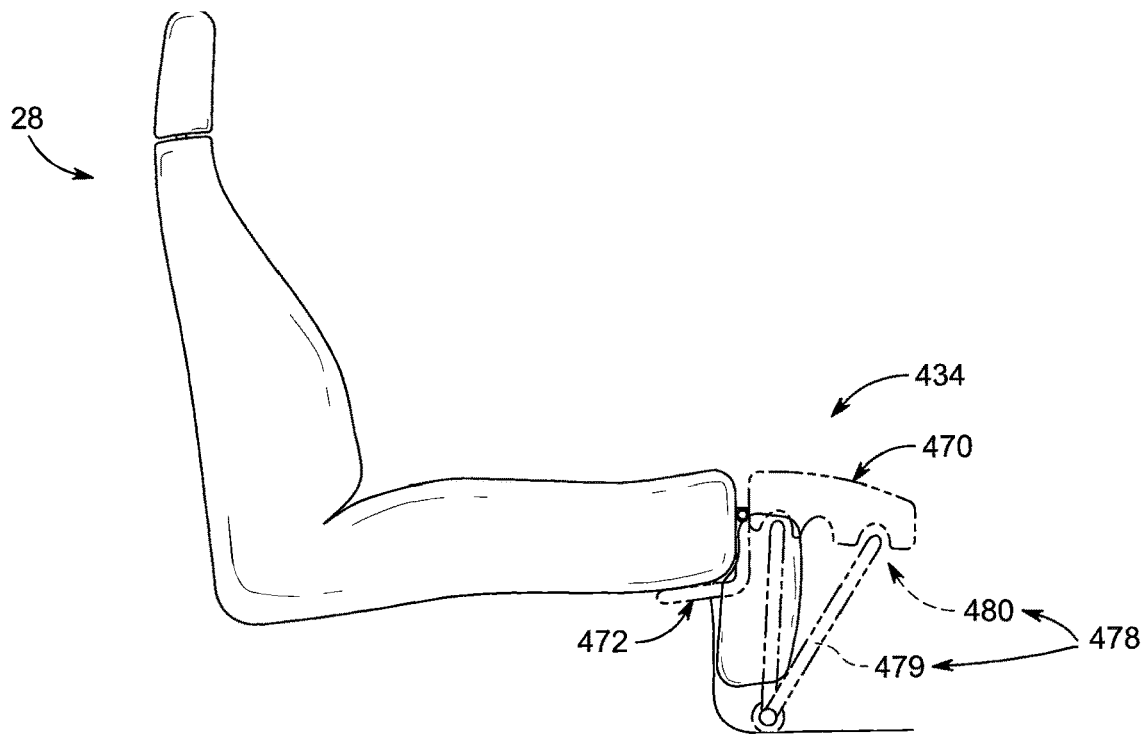
FIG. 6 is a side elevation view of a fourth embodiment of a first leg support included in the occupant-support module and including a cushion, a fixed mount, and an adjustment system configured to support the cushion in a plurality of extended positions.

A fourth embodiment of a first leg support 434 is shown in FIG. 6. The leg support 434 is similar to the second embodiment of the leg support 234 shown in FIG. 4 and similar reference numbers in the 400 series are used to describe common features between leg support 234 and leg support 434. Accordingly, the disclosure of leg support 234 is incorporated by reference for leg support 434 and differences between leg support 234 and leg support 434 are described below.

Leg support 434 includes a cushion 470, a fixed mount 472, and an adjustment system 478 as shown in FIG. 6. The cushion 470 is configured to pivot relative to the fixed mount 472 between a storage position and an extended position as suggested in FIG. 6. The fixed mount 472 is coupled to the rear occupant support 28 to secure the leg support 434 to the rear occupant support 28. The adjustment system 478 is configured to block movement of the cushion 470 from pivoting downward. The adjustment system 478 includes a support rod 479 and a plurality of grooves 480 formed in an underside of the cushion 470. The support rod 479 is sized to fit in one of the grooves 480 to hold the cushion in an extended position. The support rod 479 may be relocated to another groove 480 to change the orientation of the cushion 470 between the storage position and the extended position.

Figure 7:
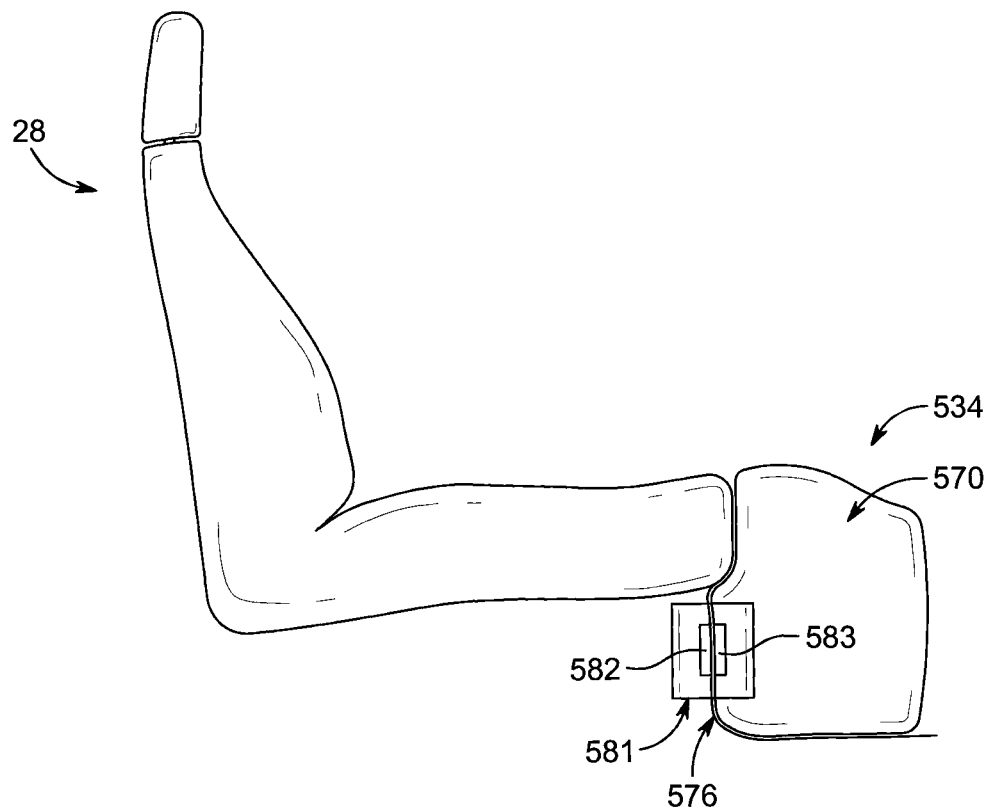
FIG. 7 is a side elevation view of a fifth embodiment of a first leg support included in the occupant-support module and including a cushion and a magnetic retainer system configured to retain the cushion to a front end of the rear-row occupant support.

A fifth embodiment of a first leg support 534 is shown in FIG. 7. The leg support 534 is similar to the first embodiment of the leg support 34 shown in FIGS. 1 and 3 and similar reference numbers in the 500 series are used to describe common features between leg support 34 and leg support 534. Accordingly, the disclosure of leg support 34 is incorporated by reference for leg support 534 and differences between leg support 34 and leg support 534 are described below.

Leg support 534 includes a cushion 570 and a retainer system 581 as shown in FIG. 7. The cushion 570 is configured to support a passenger's legs and extends an overall length of the rear occupant support 28. The retainer system 581 is configured to retain the cushion 570 to a frame structure 576 of the rear occupant support 28. The retainer system 581 includes a first magnetic element 582 coupled to the frame structure 576 and a second magnetic element 583 coupled to the cushion 570. The cushion 570 may be separated from the rear occupant support 28 by applying force to release the first and second magnetic elements 582, 583.

A sixth embodiment of a first leg support 634 is shown in FIG. 8. The leg support 634 is similar to the fourth embodiment of the leg support 434 shown in FIG. 6 and similar reference numbers in the 600 series are used to describe common features between leg support 434 and leg support 634. Accordingly, the disclosure of leg support 434 is incorporated by reference for leg support 634 and differences between leg support 434 and leg support 634 are described below.

Leg support 634 includes a cushion 670, a fixed mount 672, and an over-center linkage system 684 as shown in FIG. 8. The cushion 670 is configured to pivot relative to the fixed mount 672 between a storage position and an extended position as suggested in FIG. 8. The fixed mount 672 is coupled to the rear occupant support 28 to secure the leg support 634 to the rear occupant support 28. The over-center linkage system 684 is configured to block the cushion 670 from pivoting downward once it has reached the extended position. Application of a force on the over-center linkage system 684 from beneath the cushion 670 allows the cushion to return to the storage position.

A second embodiment of an occupant-comfort module 720 for use in a vehicle 710 is shown in FIG. 9. The occupant-comfort module 720 is similar to the first embodiment of the occupant-comfort module 20 shown in FIG. 1 and similar reference numbers in the 700 series are used to describe common features between occupant-comfort module 20 and occupant-comfort module 720. Accordingly, the disclosure of occupant-comfort module 20 is incorporated by reference for occupant-comfort module 720 and differences between occupant-comfort module 20 and occupant-comfort module 720 are described below.

The occupant-comfort module 720 is configured to enhance comfort for the passenger seated on the rear occupant support 728 in the passenger compartment 718 as shown in FIG. 9. The occupant-comfort module 720 includes a removable lumbar support 730 and a leg support system 732. The removable lumbar support 730 is configured to improve posture by engaging the occupant's lower back so that the occupant's spine is urged to an S-shape. The removable lumbar support 730 may cause the passenger's pelvic region and legs to be shifted forward relative to the occupant support such that the occupant's legs have less contact with the occupant support than they would absent the removable lumbar support 730. The leg support system 732 is configured to engage portions of the passenger's legs to increase overall support and comfort for the passenger.

The removable lumbar support 730 and the leg support system 732 may cooperate to provide a reclining effect on the passenger without moving any portion of the occupant support 728. Such an effect may be beneficial when used with rear-row occupant supports that have less functionality compared to front-row occupant supports, for example, when the rear-row occupant support is positioned against a rear panel 745 of the vehicle 710 and cannot recline due to this arrangement. Since the rear occupant support 728 is positioned behind the front-row occupant support 726, privacy is also increased for the passenger.

The leg support system 732 includes a first leg support 734 coupled to a front end 736 of the rear occupant support 728 and a second leg support 738 spaced apart from the rear occupant support 728 and the first leg support 734 as shown in FIG. 9. The first leg support 734 is mounted to the front end 736 of the rear occupant support 728 to support the passenger's thighs and/or calves. The second leg support 738 is mounted to a floor 740 of the vehicle 710 in front of the rear occupant support 728 to support the occupants feet.

The first leg support 734 may be a stationary structure or may be mounted to the front end 736 of the rear occupant support 728 for pivotable movement relative to the occupant support 728 about a pivot axis 742 to raise and lower the first leg support 734. The second leg support 738 is mounted to tracks 744 located in front of the rear occupant support 728 in the front section 724 as shown in FIG. 9. The tracks 744 may have been used to mount a front-row occupant support to the floor 740 of the vehicle 710 which the second leg support 738 has taken then place of. The second leg support 738 is slidable forward and backward along the tracks 744 and may be locked in place at any point along a length of the tracks 744 to fit passengers of different sizes. The location of the second leg support 738 relative to a front panel or dash 756 of the vehicle 710 provides a storage space 754 that can be used to store one or more of the passenger's items such as a travel bag 755. The passenger's items in the storage space 754 are accessible by the passenger when desired as opposed to being stored in an inaccessible location such as a trunk of the vehicle 710.

The second leg support 738 includes a calf rest 746, a first mount 748 and a second mount 750 as shown in FIG. 9. The calf rest 746 allows a passenger seated in rear occupant support 728 to rest their calves above the floor 740 in a fully extended position for greater comfort. The calf rest 746 is coupled at each end to the first mount 748 and the second mount 750, respectively. The first and second mounts 748, 750 are coupled to an associated track 744 that extends along the floor 740 to fix the calf rest 746 in position relative to the rear occupant support 728.

The following numbered clauses include embodiments that are contemplated and non-limiting:

Clause 1. An over-the-road vehicle comprises a vehicle body defining a cabin, the cabin comprising a forward section, a rear section arranged to lie behind the forward section relative to a longitudinal axis of the vehicle, and at least one passenger compartment that is defined by portions of both the forward section and the rear section.

Clause 2. The vehicle of clause 1, any other clause or any suitable combination of clauses, further comprising a plurality of occupant supports including a forward occupant support arranged to lie in the forward section of the cabin and a rear occupant support offset from the front occupant support relative to a lateral axis of the vehicle and arranged to lie in the rear section of the cabin and in the passenger compartment such that the passenger compartment includes only the rear occupant support out of the plurality of occupant supports.

Clause 3. The vehicle of clause 2, any other clause or any suitable combination of clauses, further comprising a passenger-comfort module including a removable lumbar cushion coupled to the rear occupant support and a leg support system including a first leg support coupled to a front end of the rear occupant support in the rear section of the cabin and a second leg support arranged to lie in the forward section of the cabin.

Clause 4. The vehicle of clause 3, any other clause or any suitable combination of clauses, wherein the second leg support is mounted to tracks and arranged to lie in spaced-apart relation to the first leg support so that the occupant may support their legs in a fully-extended position outwardly away from the occupant support on the second leg support.

5. The vehicle of clause 4, any other clause or any suitable combination of clauses, wherein the second leg support is spaced apart from a front panel of the vehicle to provide a storage space there between.

6. The vehicle of clause 4, any other clause or any suitable combination of clauses, wherein the rear occupant support directly contacts a rear panel of the vehicle and the removable lumbar cushion and the leg support system cooperate to provide a reclining effect for the occupant.

7. The vehicle of clause 6, any other clause or any suitable combination of clauses, wherein the first leg support extends an overall length of the rear occupant support to increase contact areas with the occupant's legs as a result of the occupant's pelvic region being moved forward by the removable lumbar support.

8. The vehicle of clause 3, any other clause or any suitable combination of clauses, wherein the passenger compartment is greater than or equal to about half of a total cumulative volume of the cabin.

9. An occupant-comfort module for an over-the-road vehicle, the occupant comfort module comprises an occupant support adapted to lie in a rear section of a vehicle, 10. The occupant-comfort module of clause 9, any other clause or any suitable combination of clauses, further comprising a removable lumbar support coupled to the occupant support, Clause 11. The occupant-comfort module of clause 10, any other clause or any suitable combination of clauses, further comprising a first leg support coupled to a forward end of the occupant support and adapted to engage at least one of a thigh and a calf of an occupant seated in the occupant support, and Clause 12. The occupant-comfort module of clause 11, any other clause or any suitable combination of clauses, further comprising a second leg support adapted to be mounted to tracks on a floor of a vehicle and arranged to lie in spaced-apart relation to the first leg support so that the occupant may support their legs in a fully-extended position outwardly away from the occupant support on the second leg support.

13. The occupant-comfort module of clause 12, any other clause or any suitable combination of clauses, wherein the first leg support includes a cushion, a mount flange coupled to the cushion and a retainer bracket coupled to the occupant support and the mount flange and the retainer bracket are slidably engaged with one another so that the cushion is separable from the occupant support.

14. The occupant-comfort module of clause 12, any other clause or any suitable combination of clauses, wherein the first leg support includes a cushion, a fixed mount, and a ratchet system configured to control pivotable movement of the cushion relative to the fixed mount.

15. The occupant-comfort module of 12, any other clause or any suitable combination of clauses, wherein the first leg support includes a cushion, a fixed mount, and a plurality of inflatable bladder arranged between the fixed mount and the cushion and configured to push the cushion away from the fixed mount when inflated to raise an occupant's legs.

16. The occupant-comfort module of clause 12, any other clause or any suitable combination of clauses, wherein the first leg support includes a cushion, a fixed mount, and an adjustment system including a support rod and a plurality of grooves formed in an underside of the cushion to receive the support rod and support the cushion in an extended position.

17. The occupant-comfort module of clause 15, any other clause or any suitable combination of clauses, wherein the first leg support includes a cushion and a retainer system including a first magnetic element coupled to the occupant support and a second magnetic element coupled to the cushion.

18. The occupant-comfort module of clause 12, any other clause or any suitable combination of clauses, wherein the first leg support includes a cushion, a fixed mount, and an over-center linkage system configured to support the cushion in an extended position.

19. The occupant-comfort module of clause 12, any other clause or any suitable combination of clauses, wherein the second leg support includes a footrest a first mount coupled to a first track and a second mount coupled to a second track and the footrest is arranged at an angle relative to the floor and is adjustable to vary the angle.

20. The occupant-comfort module of clause 12, any other clause or any suitable combination of clauses, wherein the second leg support includes a calf rest, a first mount coupled to a first track and a second mount coupled to a second track and the calf rest is configured to support the occupant's legs above the floor in the fully-extended position.

21. A method of providing an occupant comfort module in an over-the-road vehicle, the method comprises a step of removing an occupant support from the vehicle, the occupant support being second occupant support arranged forward of a first occupant support relative to a longitudinal axis of the vehicle prior to the step of removing.

22. The method of clause 21, any other clause or any suitable combination of clauses, further comprising a step of mounting a first leg support to a forward end of the first occupant support.

23. The method of clause 22, any other clause or any suitable combination of clauses, further comprising a step of mounting a second leg support to an attachment location where the second occupant support was mounted to the vehicle prior to the step of removing.

24. The method of clause 23, any other clause or any suitable combination of clauses, wherein the attachment location includes tracks and the second leg support is slidable forward and backward along the tracks.

25. The method of clause 24, any other clause or any suitable combination of clauses, wherein the first occupant support is arranged to lie in a passenger compartment that extends from a rear section of the vehicle to a front section of the vehicle unobstructed by any other vehicle seat in front of the first occupant support.

26. The method of clause 25, any other clause or any suitable combination of clauses, further comprising a step of mounting a removable lumbar cushion to the first occupant support and adjusting the first leg support and the second leg support so that the occupant's legs are supported after the occupant's pelvic region is shifted forward by the removable lumbar cushion.

27. The method of clause 25, any other clause or any suitable combination of clauses, further comprising the step of mounting an accessory to the first leg support or the second leg support, the accessory including at least one of a table, a monitor, and a privacy screen.

The invention claimed is:

1. An over-the-road vehicle comprising
a vehicle body defining a cabin, the cabin comprising a forward section, a rear section arranged to lie behind the forward section relative to a longitudinal axis of the vehicle, and at least one passenger compartment that is defined by portions of both the forward section and the rear section,
a plurality of occupant supports including a forward occupant support arranged to lie in the forward section of the cabin and a rear occupant support offset from the front occupant support relative to a lateral axis of the vehicle and arranged to lie in the rear section of the cabin and in the passenger compartment such that the passenger compartment includes only the rear occupant support out of the plurality of occupant supports, and
a passenger-comfort module arranged to lie within the passenger compartment, the passenger-comfort module including a removable lumbar cushion coupled to the rear occupant support and a leg support system including a first leg support coupled to a front end of the rear occupant support in the rear section of the cabin and a second leg support arranged to lie in the forward section of the cabin.

2. The vehicle of claim 1, wherein the second leg support is mounted to tracks and arranged to lie in spaced-apart relation to the first leg support so that the occupant may support their legs in a fully-extended position outwardly away from the occupant support on the second leg support.

3. The vehicle of claim 2, wherein the second leg support is spaced apart from a front panel of the vehicle to provide a storage space there between.

4. The vehicle of claim 2, wherein the rear occupant support directly contacts a rear panel of the vehicle and the removable lumbar cushion and the leg support system cooperate to provide a reclining effect for the occupant.

5. The vehicle of claim 4, wherein the first leg support extends an overall length of the rear occupant support to increase contact areas with the occupant's legs as a result of the occupant's pelvic region being moved forward by the removable lumbar support.

6. The vehicle of claim 1, wherein the passenger compartment is greater than or equal to about half of a total cumulative volume of the cabin.

7. An occupant-comfort module for an over-the-road vehicle, the occupant comfort module comprising an occupant support adapted to lie in a passenger compartment of the vehicle, the passenger compartment containing at least two rows of occupant supports within the vehicle, and the occupant support is the only occupant support in the passenger compartment, a first leg support arranged to lie in the passenger compartment and coupled to a forward end of the occupant support the first leg support being adapted to engage at least one of a thigh and a calf of an occupant seated in the occupant support, and a second leg support arranged to lie in the passenger compartment and adapted to be mounted directly to tracks on a floor of the vehicle the second leg support being arranged to lie in spaced-apart relation to the first leg support so that the occupant may support their legs in a fully-extended position outwardly away from the occupant support on the second leg support.

8. The occupant-comfort module of claim 7, wherein the first leg support includes a cushion, a mount flange coupled to the cushion and a retainer bracket coupled to the occupant support and the mount flange and the retainer bracket are slidably engaged with one another so that the cushion is separable from the occupant support.

9. The occupant-comfort module of claim 7, wherein the first leg support includes a cushion, a fixed mount, and a ratchet system configured to control pivotable movement of the cushion relative to the fixed mount.

10. The occupant-comfort module of claim 7, wherein the first leg support includes a cushion, a fixed mount, and a plurality of inflatable bladder arranged between the fixed mount and the cushion and configured to push the cushion away from the fixed mount when inflated to raise an occupant's legs.

11. The occupant-comfort module of claim 7, wherein the first leg support includes a cushion, a fixed mount, and an adjustment system including a support rod and a plurality of grooves formed in an underside of the cushion to receive the support rod and support the cushion in an extended position.

12. The occupant-comfort module of claim 7, wherein the first leg support includes a cushion and a retainer system including a first magnetic element coupled to the occupant support and a second magnetic element coupled to the cushion.

13. The occupant-comfort module of claim 7, wherein the first leg support includes a cushion, a fixed mount, and an over-center linkage system configured to support the cushion in an extended position.

14. The occupant comfort module of claim 7, wherein the second leg support includes a footrest, a first mount coupled to a first track, and a second mount coupled to a second track, and wherein the footrest is arranged at an angle relative to the floor and is adjustable to vary the angle.

15. The occupant-comfort module of claim 7, wherein the second leg support includes a calf rest, a first mount coupled to a first track, and a second mount coupled to a second track, and wherein the calf rest is configured to support the occupant's legs above the floor in the fully-extended position.

16. An over-the-road vehicle comprising a vehicle body defining a cabin, the cabin comprising a forward section, a rear section arranged to lie behind the forward section relative to a longitudinal axis of the vehicle, and at least one passenger compartment that is defined by portions of both the forward section and the rear section, a plurality of occupant supports including a forward occupant support arranged to lie in the forward section of the cabin and a rear occupant support offset from the front occupant support relative to a lateral axis of the vehicle and arranged to lie in the rear section of the cabin and in the passenger compartment such that the passenger compartment includes only the rear occupant support out of the plurality of occupant supports, and a passenger-comfort module arranged to lie within the passenger compartment, the passenger-comfort module including a first leg support coupled to a front end of the rear occupant support in the rear section of the cabin and a second leg support arranged to lie in the forward section of the cabin.

17. The vehicle of claim 16, wherein the second leg support is mounted to tracks and arranged to lie in spaced-apart relation to the first leg support so that the occupant may support their legs in a fully-extended position outwardly away from the occupant support on the second leg support.

18. The vehicle of claim 17, wherein the second leg support is spaced apart from a front panel of the vehicle to provide a storage space there between.

19. The vehicle of claim 16, wherein the passenger compartment is greater than or equal to about half of a total cumulative volume of the cabin.

20. The vehicle of claim 16, wherein the first leg support includes a cushion, a fixed mount, and a ratchet system configured to control pivotable movement of the cushion relative to the fixed mount.

\* \* \* \* \*